(12) United States Patent
Muller et al.

(10) Patent No.: US 12,422,356 B2
(45) Date of Patent: Sep. 23, 2025

(54) VARIABLE PATH LENGTH ABSORPTION SPECTROMETER HAVING AUTOMATED CONTINUOUS SLOPE MEASUREMENT

(71) Applicant: Repligen Corporation, Waltham, MA (US)

(72) Inventors: Matthew Muller, Cranford, NJ (US); Richard Hall, III, Bernardsville, NJ (US); Yusheng Zhang, Stewartsville, NJ (US); Peter Halatin, Howell, NJ (US)

(73) Assignee: Repligen Corporation, Waltham, MA (US)

( * ) Notice: Subject to any disclaimer, the term of this patent is extended or adjusted under 35 U.S.C. 154(b) by 312 days.

(21) Appl. No.: 18/198,701

(22) Filed: May 17, 2023

(65) Prior Publication Data

US 2023/0375467 A1 Nov. 23, 2023

Related U.S. Application Data

(60) Provisional application No. 63/343,368, filed on May 18, 2022.

(51) Int. Cl.
*G01N 21/33* (2006.01)

(52) U.S. Cl.
CPC ....... *G01N 21/33* (2013.01); *G01N 2201/062* (2013.01)

(58) Field of Classification Search
CPC ............. G01N 21/33; G01N 2201/062; G01N 2201/0662; G01N 21/31;

(Continued)

(56) References Cited

U.S. PATENT DOCUMENTS 4,634,277 A  1/1987  Stockdale
6,704,109 B2  3/2004  Wu et al.
(Continued)

FOREIGN PATENT DOCUMENTS

AU  2011214172 A1  8/2012
AU  2013205020 A1  5/2013

OTHER PUBLICATIONS

International Search Report and Written Opinion for the International Application No. PCT/US2023/022571, mailed Aug. 3, 2023, 13 pages.
(Continued)

*Primary Examiner* — Md M Rahman
(74) *Attorney, Agent, or Firm* — KDW Firm PLLC

(57) ABSTRACT

A system may include a light source, to generate a probe signal, comprising incident radiation; an optical probe, to direct the incident radiation through a fluid sample; a motor, to move the optical probe along a probe axis, to change a path length of the incident radiation through the fluid sample; and a detector, to receive the incident radiation as attenuated radiation after passing through the fluid sample. The system may include a control system, arranged to: initiate an absorbance measurement by directing movement of the optical probe along the probe axis; direct the light source to emit the incident radiation; and automatically adjust at least one measurement parameter of a set of measurement parameters for the sample measurement, based upon a slope parameter m, wherein m is derived from a rate of change in an intensity of the attenuated radiation with a change in the path length.

18 Claims, 7 Drawing Sheets

(58) Field of Classification Search
CPC ....... G01N 2021/0307; G01N 21/0303; G01N 2021/8528; G01N 2201/0627; G01N 2201/08; G01N 21/8507
USPC .......................................................... 356/440
See application file for complete search history.

(56) References Cited

U.S. PATENT DOCUMENTS

| | | |
|---|---|---|
| 6,879,741 B2 | 4/2005 | Salerno |
| 7,759,651 B2 | 7/2010 | Knight et al. |
| 7,808,641 B2 | 10/2010 | Salerno |
| 7,980,745 B2 | 7/2011 | Shanbaky |
| 9,404,851 B2 | 8/2016 | Shih |
| 9,952,350 B1 | 4/2018 | DiFoggio |
| 10,830,778 B2 | 11/2020 | Salerno |
| 11,300,447 B2 | 4/2022 | Shih |
| 2015/0098082 A1 | 4/2015 | Wang |
| 2015/0244145 A1 | 8/2015 | Taubman et al. |
| 2015/0268095 A1 | 9/2015 | Kovacich et al. |
| 2017/0356848 A1 | 12/2017 | Ehring |
| 2019/0212258 A1 | 7/2019 | Harrison |
| 2020/0003940 A1 | 1/2020 | Smith et al. |
| 2021/0096128 A1 | 4/2021 | Peyser |
| 2022/0026160 A1 | 1/2022 | Perreault |
| 2022/0042969 A1 | 2/2022 | Harrison |
| 2022/0268628 A1 | 8/2022 | Gantier |
| 2023/0002801 A1 | 1/2023 | Dutta |

OTHER PUBLICATIONS

International Search Report and Written Opinion for the International Application No. PCT/US2023/022572, mailed Aug. 3, 2023, 12 pages.

The International Preliminary Report on Patentability mailed Nov. 28, 2024, for corresponding PCT/US2023/022571 (seven (7) pages.

Marcus et al., "Optical path length and absorption cross section optimization for high sensitivity ozone concentration measurement," Sensors and Actuators B: Chemical, vol. 221, 2015, pp. 570-575.

International Search Report and Written Opinion for the International Application No. PCT/US2023/022577, mailed Aug. 8, 2023, 14 pages.

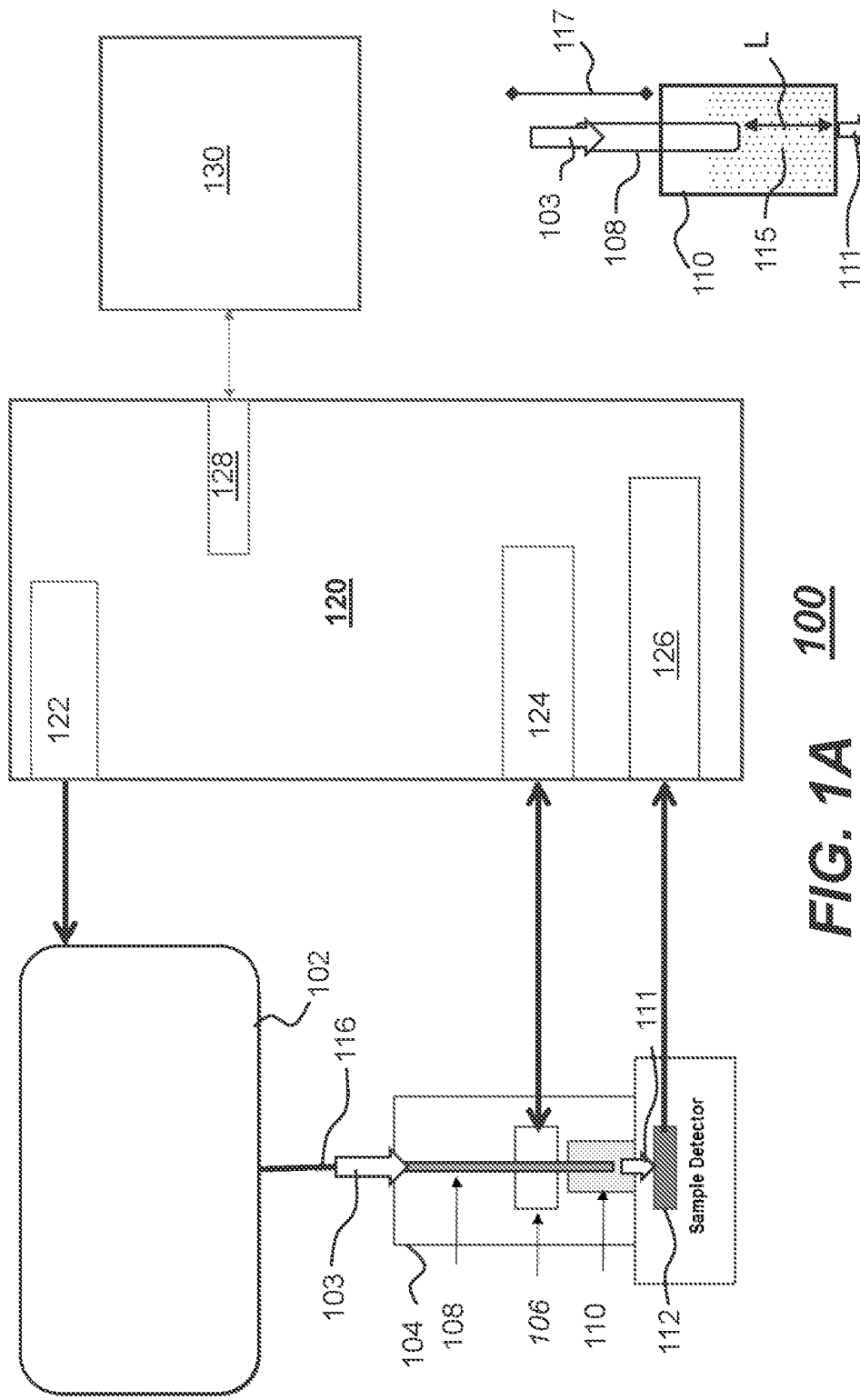

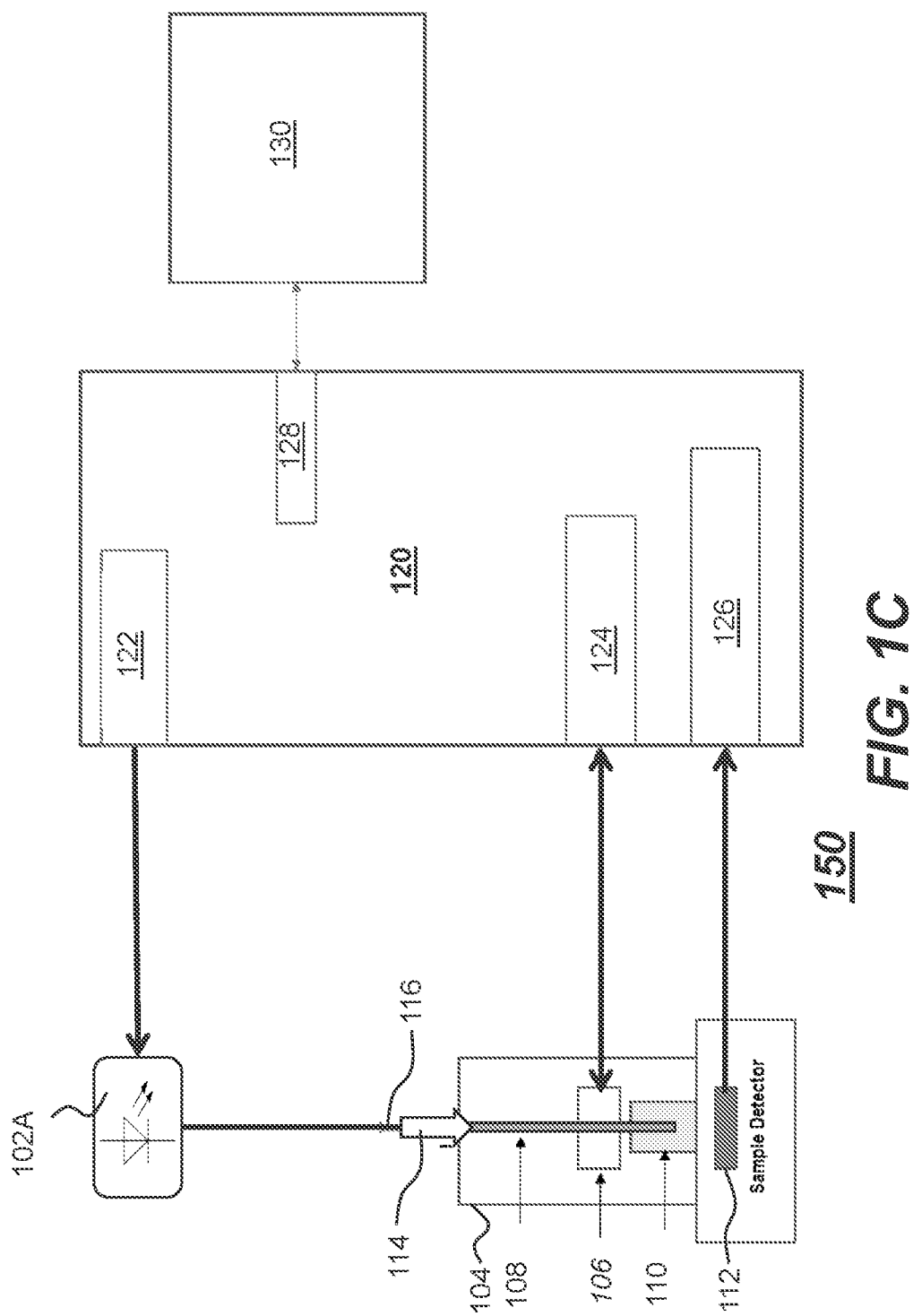

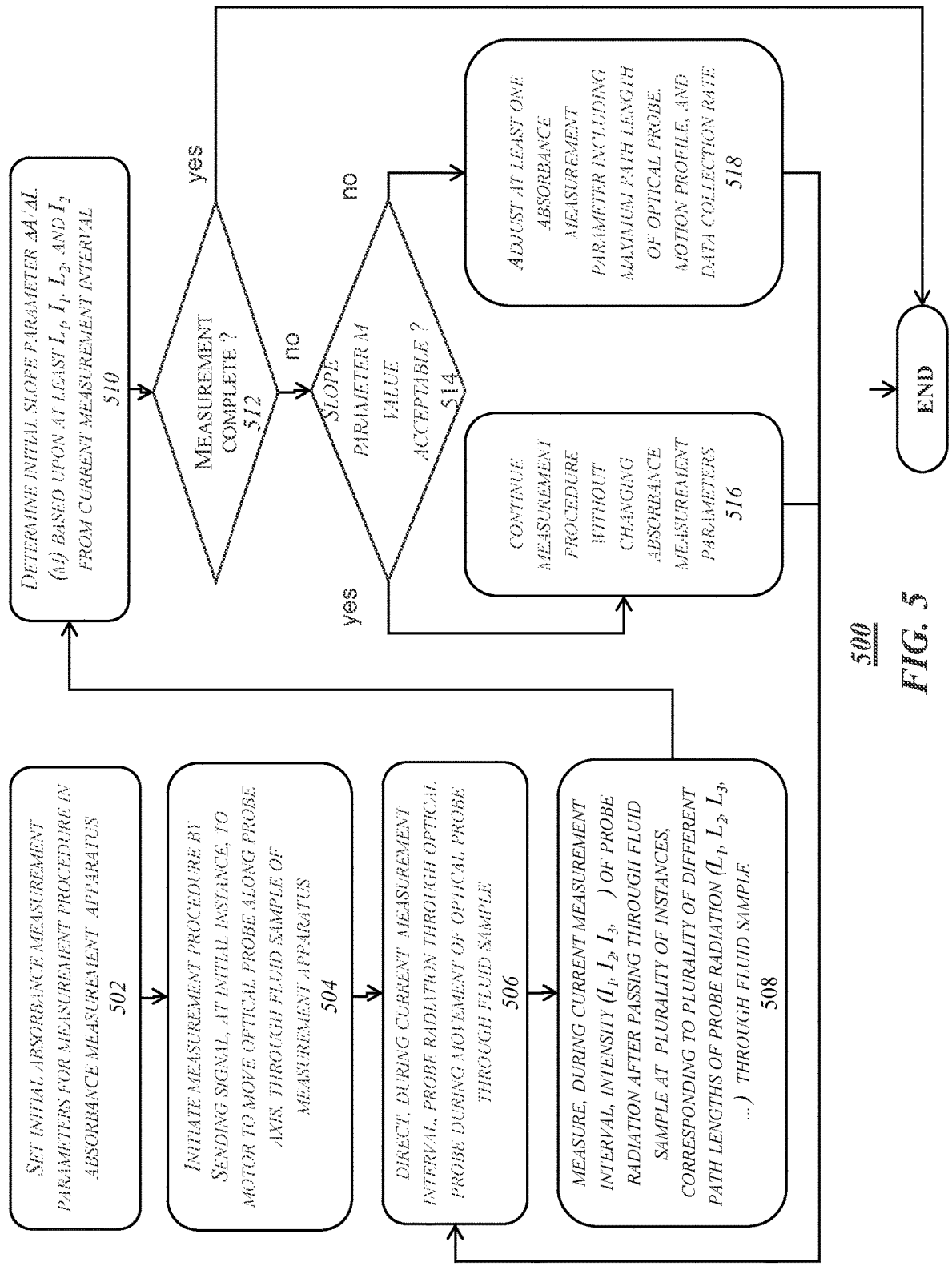

VARIABLE PATH LENGTH ABSORPTION SPECTROMETER HAVING AUTOMATED CONTINUOUS SLOPE MEASUREMENT

FIELD OF THE DISCLOSURE

This present application claims the benefit of priority under 35 U.S.C. § 119 to U.S. Provisional Application Ser. No. 63/343,368, entitled "VARIABLE PATH LENGTH ABSORPTION SPECTROMETER HAVING AUTOMATED CONTINUOUS SLOPE MEASUREMENT" filed on May 18, 2022, the disclosure of which is incorporated herein by reference in its entirety.

BACKGROUND OF THE DISCLOSURE

Field of the Disclosure

Embodiments of the disclosure relate generally to spectroscopic analysis, and more particularly to solution analysis using light source coupled with a variable path length measurement system.

Discussion of Related Art

Absorption spectroscopy is used to measure composition and/or properties of a material in any phase, gas, liquid, solid. For example, the optical absorption spectra of liquid substances may be measured to determine concentration or other properties of a species of interest, within a liquid medium. An absorption spectra may provide the distribution of light attenuation (due to absorbance) as a function of light wavelength. In a known spectrophotometer the sample substance to be studied is placed in a transparent container, so that electromagnetic radiation (light) of a known wavelength, $\lambda$, (i.e. ultraviolet, infrared, visible, etc.) and intensity I may be measured after passing through the transparent container, using a suitable detector.

Known ultraviolet (UV)/visible spectrophotometers utilize containers such as standard cuvettes, which containers may have a standard cm path length through which the incident light is conducted within the liquid containing the substance to be measured. For a sample consisting of a single homogeneous substance having a concentration c, the light transmitted through the sample will follow a relationship know as Beer's Law: $A=\varepsilon CL$ where A is the absorbance (also known as the optical density (OD) of the sample at wavelength $\lambda$ where OD=the $-\log$ of the ratio of transmitted light to the incident light), $\varepsilon$ is the absorptivity or extinction coefficient (normally at constant at a given wavelength), C is the concentration of the sample, and L is the path length of light through the sample. Thus, in principle, information regarding concentration of the homogenous substance may be determined based upon recorded light intensity of a signal passing through the sample container. However, under some circumstances, the determination of concentration in such apparatus may be difficult. Often a compound of interest in solution is highly concentrated. For example, certain biological samples, such as proteins, DNA or RNA are often isolated in concentrations that fall outside the linear range of the spectrophotometer when absorbance is measured. Therefore, dilution of the sample is often required to measure an absorbance value that falls within the linear range of the instrument. Frequently multiple dilutions of the sample are required, which leads to both dilution errors and the removal of the sample diluted for any downstream application. It is therefore useful to take existing samples without knowledge of the possible concentration and to measure the absorption of these samples without dilution. One resulting feature common to these known ultraviolet (UV)/visible spectrophotometers is that the path length L be known with great accuracy so that an accurate concentration measurement can be made.

To address these challenges, a technology based upon a variable path length spectrophotometer has recently been developed. This type of spectroscopy system may generally employ a known light source, such as a source based upon a UV/visible spectrophotometer. Light from the UV/visible spectrophotometer is then directed to a special probe in an analysis instrument that is arranged to dynamically change the path length L in a special sample chamber during an absorbance measurement. Thus, radiation that is generated from the UV/visible spectrophotometer source is detected after passing through the sample chamber, while the movement of the probe varies the path length L through multiple different positions. As such, a series of measurements are produced that generate a different value of A for each different value of L, in a manner that does not require knowledge of any particular path length L, in order to determine the concentration C.

While such variable path length spectroscopy may be adapted for in-line measurements of a sample, while conducted through a production system, for example, the instrumentation required for such measurement scenarios may require extensive installation effort and an undue amount of space. For example, a UV/visible photospectrometer system used as a light source may occupy several cubic feet of space and may have a weight on the order of several tens of kilograms. With respect to these and other considerations, the present disclosure is provided.

SUMMARY OF THE DISCLOSURE

In one embodiment, a system is provided. The system may include a light source, to generate a probe signal, comprising incident radiation; an optical probe, to direct the incident radiation through a fluid sample; a motor, to move the optical probe along a probe axis, to change a path length of the incident radiation through the fluid sample; and a detector, to receive the incident radiation as attenuated radiation after passing through the fluid sample. The system may include a control system, arranged to: initiate an absorbance measurement by directing movement of the optical probe along the probe axis, direct the light source to emit the incident radiation; and automatically adjust at least one measurement parameter of a set of measurement parameters for the sample measurement, based upon a slope parameter in, wherein m is derived from a rate of change in an intensity of the attenuated radiation with a change in the path length.

In another embodiment, a method of determining concentration of a material in a fluid sample is provided. The method may include initiating a sample measurement of the fluid sample to determine the concentration, by sending a signal to move an optical probe through a sample vessel containing the fluid sample. The method may also include triggering, at a plurality of instances during a measurement interval, a light source to emit an incident radiation through the optical probe and the fluid sample, wherein a path length L of the incident radiation through the fluid sample is varied. The method may further include receiving, at the plurality of instances during the measurement interval, a measurement of an intensity I of attenuated radiation, derived from the incident radiation after passing through the fluid sample. The method may additionally include automatically adjusting at least one measurement parameter of a set of measurement parameters for the sample measurement, based upon a slope parameter m, wherein m is derived from a rate of change in I with a change in L during the measurement interval.

In another embodiment, there is provide a non-transitory computer-readable storage medium storing computer-readable program code executable by a processor to: initiate a sample measurement to determine a concentration of a substance in a fluid sample, by sending a signal to move an optical probe through a sample vessel containing the fluid sample; trigger, at a plurality of instances during a measurement interval, a light source to emit an incident radiation through the optical probe and the fluid sample, wherein a path length L of the incident radiation through the fluid sample is varied; receive, at the plurality of instances during the measurement interval, a measurement of an intensity I of attenuated radiation, derived from the incident radiation after passing through the fluid sample; and automatically adjust at least one measurement parameter of a set of measurement parameters for the sample measurement, based upon a slope parameter m, wherein m is derived from a rate of change in I with a change in L during the measurement interval.

BRIEF DESCRIPTION OF THE DRAWINGS

The accompanying drawings illustrate preferred embodiments of the disclosed method so far devised for the practical application of the principles thereof, and in which:

FIG. 1A depicts an absorption spectroscopy apparatus, in accordance with embodiments of the disclosure;

FIG. 1B depicts a close up of a portion of the absorption spectroscopy apparatus of FIG. 1A, in accordance with embodiments of the disclosure;

FIG. 1C shows this variant of the apparatus of FIG. 1A;

FIG. 5 presents a process flow 500, according to embodiments to the disclosure.

DESCRIPTION OF EMBODIMENTS

Figure 2A:
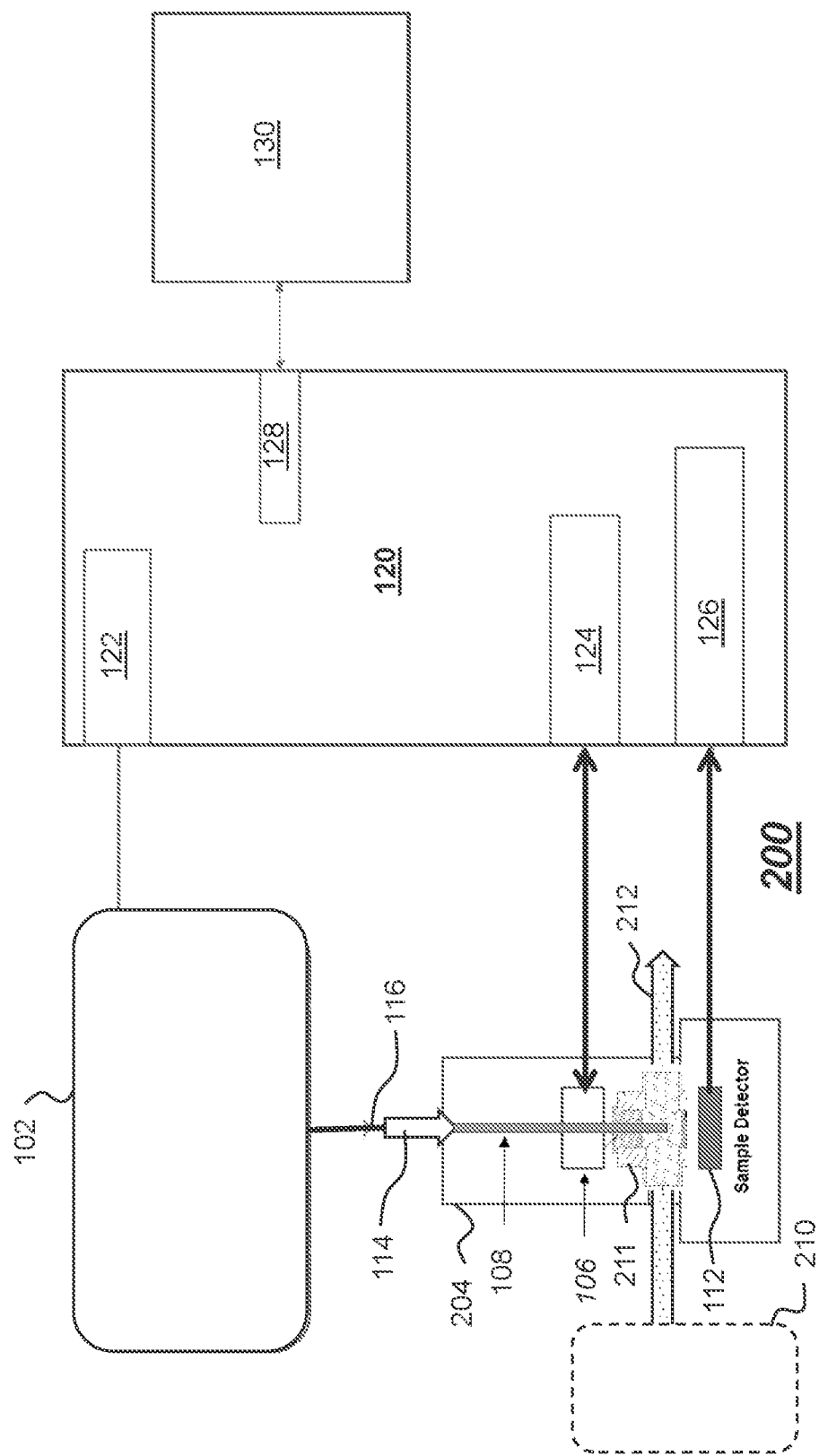
FIG. 2A depicts an absorption spectroscopy system, according to further embodiments of the disclosure.

According to embodiments of the disclosure, techniques and apparatus are provided that improve absorbance measurement based upon a variable-pathlength-measurement (VPT) apparatus architecture. The present embodiments in particular provide a streamlined and dynamic approach to determining concentration of a material in a fluid sample. The approach of the present embodiments employs multiple intensity measurements that are dynamically recorded as radiation is transmitted through the fluid sample while the path length of the radiation through the fluid sample is varied. As detailed below, and in contrast to known absorbance spectroscopy technology, the present embodiments may determine absorbance or other related parameters of the fluid sample during a measurement, so that measurement parameters may be dynamically adjusted during the measurement as needed, allowing the quality of the measurement to be improved.

FIG. 1A depicts an absorption spectroscopy apparatus, shown as system 100, in accordance with embodiments of the disclosure. The system 100 may include a light source 102, and a measurement instrument 104, coupled to the light source 102, and a detector 112, disposed next to the measurement instrument 104. The light source 102 may include a light emitting diode (LED) to generate radiation 114 at a targeted wavelength, such as in the range of 250 nm to 1000 nm according to various non-limiting embodiments. FIG. 1C shows this variant of the system 100, as system 150, having an LED light source 102A, where other components of the system 150 may function similarly to those of system 100, with like components labeled the same. In other non-limiting embodiments, the light source 102 may be a known UV/vis absorption spectrometer or UV/vis/IR absorption spectrometer. In some examples, the light source 102 may represent a single LED or an array of LEDs that emit radiation at a single wavelength. In other embodiments, a plurality of LEDs may be provided, where a given LED emits radiation at a wavelength that differs from the wavelength of another LED.

The measurement instrument 104 is arranged to contain a fluid sample that includes a material of substance to be measured, where details of variants of measurement instrument 104 are discussed below. The detector 112 is arranged to detect intensity I of the radiation transmitted through the given fluid sample that is contained in measurement instrument 104, which radiation is shown as attenuated radiation 111. In accordance with Beer Lamber law, shown in Eq. 1, below, the concentration C of a material in a sample may be determined as A/eL, where A is the absorbance and e is the molar absorptivity, and L is the path length of radiation through a fluid sample:

$$\text{Beer Lambert Law: } A = \epsilon l C \tag{1}$$

where A is determined as $\log_{10}(I_0/I)$, where $I_0$ is the intensity of the incident radiation 103, and I is the intensity of the attenuated radiation 111.

According to the approach of slope spectroscopy, the Beer Lambert law may be recast as A/L, =e C, and extended further to DA/DL, =e C, where the entity DA/DL is deemed a slope parameter m. Thus, measurement of the variation in absorbance DA with the variation in path length L will directly lead to determination of the concentration C, given knowledge of the molar absorptivity for a given substance.

It can readily be shown that DA may be determined by a series of measurements of intensity of radiation emitted from light source 102, as the path length L is varied. This relationship is detailed in Eq. (2):

$$\Delta A = A2 - A1 = \log \frac{I02}{I2} - \log \frac{I01}{I1} \tag{2}$$

where $I_{01}$ represents the intensity of incident radiation 103 at a first instance corresponding to a first path length $L_1$, $I_{02}$ represents the intensity of incident radiation 103 at a second instance corresponding to a second path length $L_2$, $I_1$ represents the intensity of attenuated radiation 111 at the first instance, and $I_2$ represents the intensity of incident radiation 103 at the second instance. Thus, from Eq (2), the change in absorbance as a function of change in path length, DA/DL or m is determined by dividing Eq (2) by the change in path length. Thus, the slope parameter DA/DL or m is equal to:

$$\left(\log\frac{I02}{I2} - \log\frac{I01}{I1}\right)/(L_2 - L_1). \quad (3)$$

In accordance with embodiments of the present disclosure, the system 100 may take advantage of circumstances where the stability of the light source 102 is sufficient that it may be assumed that $I_{01}$ and $I_{02}$ are equal to one another within a tolerable limit. Under these circumstances Eq (3) simplifies to m is equal to:

$$\frac{\Delta A}{\Delta I} = \frac{\log I1 - \log I2}{L2 - L1} \quad (4)$$

On the basis of Eq (3) or Eq (4), the system 100 measures changes in intensity of radiation from the light source 102 while L is varied by the measurement instrument 104. In particular, the light source 102 directs incident radiation 103 through a fluid sample 115 (see close up view of fluid sample 115 in FIG. 1B) contained in a sample vessel 110, via an optical probe 108 that is coupled to receive the incident radiation 103. The fluid sample 115 attenuates or absorbs a portion of the incident radiation 103, so that the attenuated radiation, such as attenuated radiation 111, will generally exhibit a lesser intensity I, than the intensity $I_0$ of incident radiation 103.

Generally, a portion of incident radiation 103 may be measured before passing through the fluid sample 115, in order to record the value of $I_0$, which parameter is used to determine in order to determine DA, in accordance with eq (2). However, in accordance with Eq (4), under circumstances where the stability of the light source 102 is sufficient, measurement of the intensity $I_0$ of incident radiation 103 may be omitted. In this case, to measure the absorbance of a fluid sample 115, just the measurement of the intensity I of attenuated radiation 111, after passing through the fluid sample 115, is recorded. Thus, to conduct an absorbance measurement, the measurement instrument 104 is equipped with an optical probe 108, together with a motor assembly 106, arranged to move the optical probe 108 along a probe axis 117. The optical probe 108 may be an optical fiber, fibrette, or bundle of fibers, arranged to conduct the incident radiation 103 to the sample vessel 110 that includes fluid sample 115, containing a material of interest, whose concentration C is to be measured. The incident radiation 103 then emerges as attenuated radiation 111 to be recorded by detector 112. Suitable examples of the detector 112 include a photomultiplier tube, a photodiode, an avalanche photodiodes, a charge-coupled device (CCD), and intensified CCDs, among others.

The movement of the optical probe 108 is effective to vary the path length L, of radiation traveling through the fluid sample 115 in sample vessel 110, while at the same time a measurement of intensity I, of attenuated radiation 111, is conducted for each value of L. In various non-limiting embodiments where the sample vessel 110 is coupled to external fluid lines of a processing system or apparatus, the volume of fluid sample 115 within the sample vessel 110 may range between the microliter to many milliliter range, while the path length L may be variable between 0 and several cm.

The optical probe 108 may be translated in increments or continuously with respect to the sample vessel 110 in order to vary L, where increments may range from 0.2 µm to 1 cm, and more particularly in increments ranging from 1 µm to 50 µm. Thus, with knowledge of the values of $L_1$, $I_1$, $L_2$, and $I_2$, for any pairs of instances during a measurement process, the slope parameter m may be readily calculated according to equation (4).

The ability to calculate m essentially instantaneously based upon measurement of I, even while the optical probe 108 is in motion, provides several advantages, where a measurement may be adjusted in real time, for example, in an automatic fashion, as data is collected. To control operation of the measurement instrument 104 and light source 102, the system 100 may further include control elements, such as a controller 120 and computer 130. The controller 120 may include a light source drive component 122, which component, in embodiments of an LED light source, may be arranged to output an LED drive signal to emit the incident radiation 103. The controller 120, may further include a motor control component 124 that is coupled to the motor assembly 106 (which assembly may include a motor and/or a sensor (not separately shown), to direct movement of the optical probe 108 and/or to receive probe position information with respect to the optical probe 108, in order to vary L and/or determine L for any given instance. The controller 120 may further include a measurement interface 126, to receive intensity I information from the detector 112. In some examples, the controller 120 may be coupled to a computer 130, via an interface 128, for example. In some examples, the controller 120 may form part of a computer or similar computing device, which device may or may not be located remotely from the measurement instrument 104.

As such, the controller 120 may integrate motor control, light source and data acquisition under control of a single micro-controller. In particular, control of light source 102 and data acquisition, for example, from detector 112, may be synchronized to the motion of the optical probe 108. In some examples, measurements of concentration C may be taken while the optical probe 108 moves in either of two opposite directions, while L is increasing or decreasing. The use of a single controller to control the various components of system 100 allows for extremely tight synchronization (in the microsecond range) between the optical probe 108 movement, the generation of the incident radiation 103, and measurement of intensity I of attenuated radiation 111 at detector 112.

Note that during operation, the light source 102 may be a triggered LED that is triggered to fire intermittently, at times when data is to be acquired, or generally at a very low duty cycle to provide better source stability as compared to operating in a continuous mode. In various non-limiting embodiments the fraction of time that the LED is triggered over given series of periods of firing on and turning off the LED may cover a broad range of a broad range for the duty cycles. This broad range applies because the duty cycle will depend upon how long the LED will be turned on for one data point, and how soon the next data point collection is to commence. In particular non-limiting embodiments, the duty may range between approximately 0.1%~2%.

To conduct a given absorbance measurement of fluid sample 115, the controller 120 and/or computer 130, may establish a set of measurement parameters, such as a maximum path length of the optical probe 108, a motion profile, as well as a data collection rate during the measurement. A motion profile may include, for example, intervals for motor acceleration, deceleration and steady velocity. Also included are P&I motor control tuning parameters. In one example, an estimate of values for these measurement parameters may be made in advance of a measurement in order to collect the most accurate or meaningful absorbance measurements for a fluid sample containing a substance whose concentration C is to be measured. During a measurement using the initial values of measurement parameters, after an initial value of m is calculated, it may be determined that the data collection rate should be increased or decreased, or it may be determined that the maximum path length should be increased or decreased. According to embodiments of the disclosure, the system 100 may employ the controller 120 and/or computer 130 to automatically adjust the measurement parameters, as needed, in real time, in response to determination of the slope parameter m.

Figure 3:
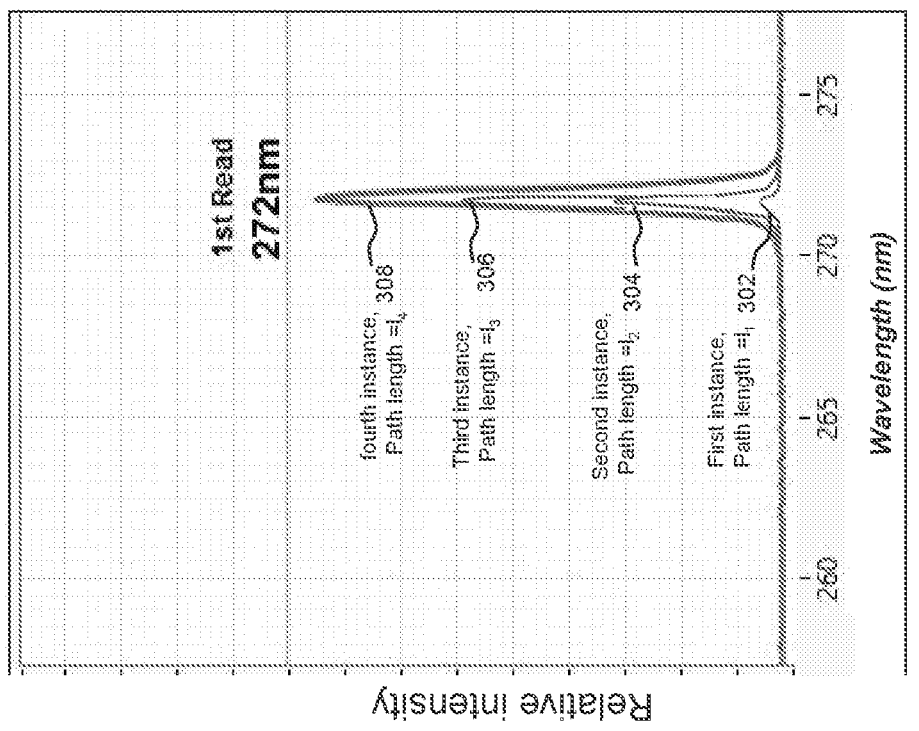
FIG. 3 depicts exemplary absorption spectra, according to embodiments of the disclosure.

To further explain these advantages FIG. 3 depicts exemplary absorption spectra, according to embodiments of the disclosure. In this example, the graph of FIG. 3 depicts detected radiation intensity as a function of wavelength in the near UV range. Four spectra are shown, generated from an LED light source, using a narrow bandpass filter so that the spectra are composed of essentially monochromatic radiation having a single peak in intensity at 272 nm, corresponding to the type of LED material used for the light source. The spectrum 302 corresponds to a first instance when the optical probe is disposed to form a first path length $L_1$ of 272 nm radiation through a fluid sample; the spectrum (curve 304) corresponds to a second instance when the optical probe is disposed to form a second path length $L_2$; the spectrum (curve 306) corresponds to a third instance when the optical probe is disposed to form a third path length $L_3$; the spectrum (curve 308) corresponds to a fourth instance when the optical probe is disposed to form a fourth path length $L_4$, where the path length is decreasing from $L_1$ to $L_4$. Note that the intensity of the 272 nm peak corresponds essentially to the intensity I, as discussed above, and the rate of increase in the intensity of the 272 nm peak with change in the value of L is proportional to the change in absorbance DA/DL, or slope coefficient m. Accordingly, in one instance, the value of DA/DL or m may be determined by measurement of the difference in I (curve 304−curve 302) and L between the first instance and the second instance. Likewise, the value of m may be determined by measurement of the difference in I (curve 306−curve 304) and L between the second instance and the third instance; by measurement of the difference in I (curve 308−curve 306) and L between the third instance and fourth instance; by measurement of the difference in I (curve 308−curve 302) and L between the first instance and fourth instance; and so forth.

Note that an absorbance measurement to generate the spectra of FIG. 3 may be performed with a set of parameters whose values are initially entered into a control system, as discussed above. These parameters may include a maximum path length, data collection rate, and so forth. Since, for a given fluid sample, the rate of change in absorbance with change in path length, that is, the value of m, will generally not be known a priori, during an absorbance measurement, the initially determined values of m may be greater than or less than an anticipated value of m that may be used at least in part to set the initial values of the measurement parameters. Thus, according to embodiments of the disclosure, the slope information obtained from analysis of spectra such as in FIG. 3, may be used to adjust measurement parameters dynamically during a measurement interval.

Figure 4:
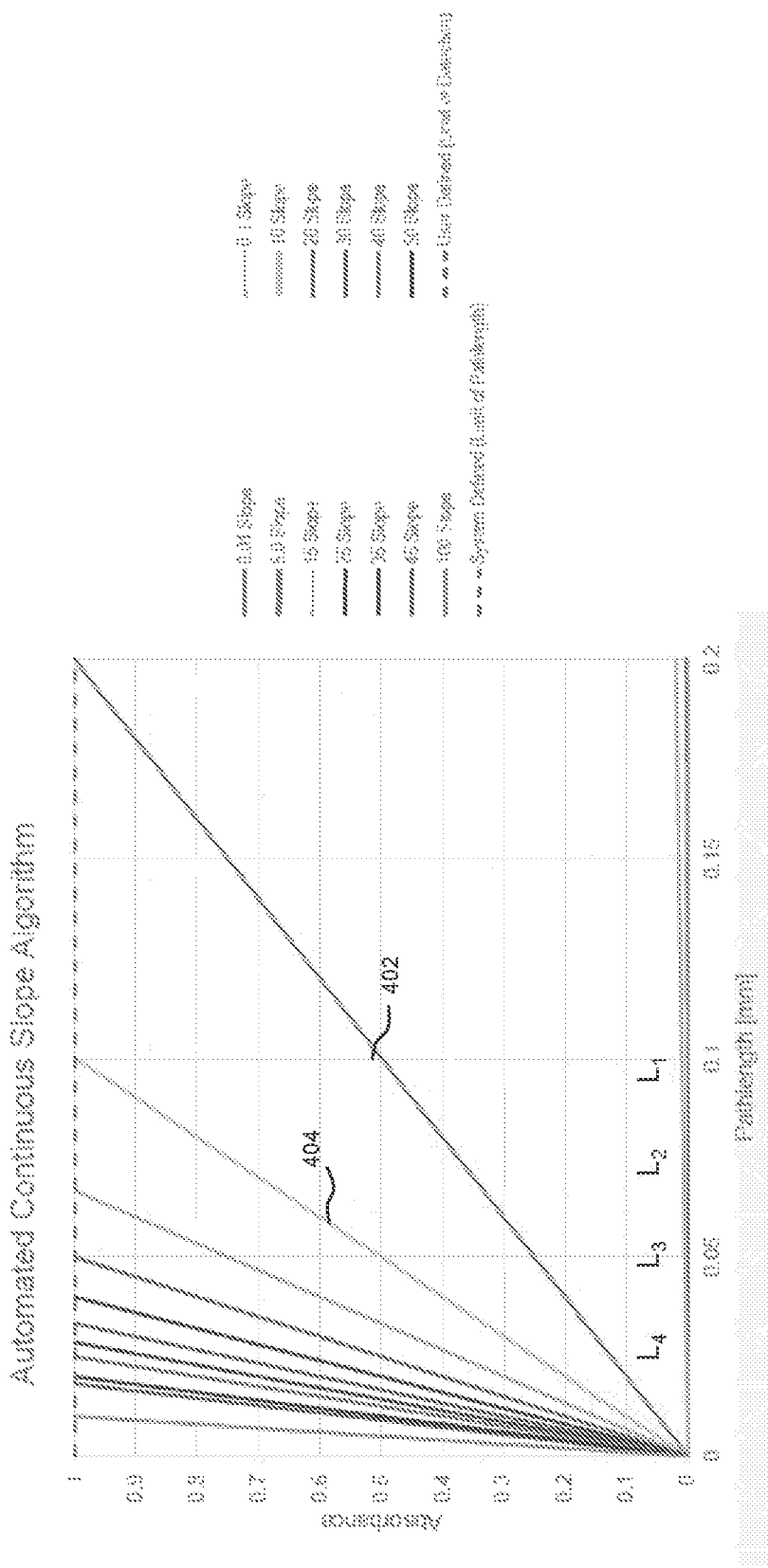
FIG. 4 illustrates a series of ideal curves, plotting absorbance vs path length for a large range of values of m.

FIG. 4 illustrates a series of ideal curves, plotting absorbance vs path length for a large range of values of m, as shown. The shallower curves represent smaller values of m, while the steeper curves represent greater values of m. For purposes of illustration, and following the example of FIG. 3, FIG. 4 illustrates exemplary values of $L_1$, $L_2$, $L_3$, and $L_4$. In this example, it may be assumed that for initial measurement parameters, a maximum path length is set at 0.1 mm, with a slope parameter m for a fluid sample to be measured anticipated to be in the range of 5.0, illustrated by curve 402. Under these conditions, the maximum absorbance at path length $L_1$ (0.1 mm) can be expected to fall in the range of 0.5, well below the maximum absorbance limit, set at 1.0. However, the recorded I values at the different absorbance spectra on FIG. 3 may correspond to absorbance values (the different absorbance curves of FIG. 3 are shown in FIG. 4 at the corresponding L and A values) that more closely align with a slope parameter of 10, corresponding to curve 404. In accordance with embodiments of the disclosure, with these results, the values of one or more measurement parameters may be automatically adjusted during measurement. For example, the path length increments used to generate the data of FIG. 3 may correspond to 0.025 mm. Since the slope parameter m is higher than anticipated, leading to very little transmission at $L_1$, the maximum path length may be reset to 0.05 mm, with the same amount of measurements, leading to small increments in path length L, to obtain more reliable spectra over an entire range of measurement. Alternatively, the number of measurements made over the range between 0 mm and 0.1 mm may be increased to increase data reliability. In another example, the speed of the motion of the optical probe may automatically be increased or decreased based upon calculation of m from an initial set of I measurements.

Note that, in accordance with the present embodiments the changes to measurement parameters may be performed by a controller in an automatic fashion based upon preset algorithms. Thus, during a measurement interval where two dozen intensity I measurements at corresponding different path lengths are initially set to be performed, after a first set of measurements are performed, such as 2 measurements, 3 measurements, or 4 measurements, targeted measurement parameters may be adjusted when the resulting calculated slope parameter m from the first set of measurements meets any suitable criterion. In one embodiment, an absorbance measurement procedure may be set to measure intensity at a plurality of instances, during continuous motion of an optical probe to decrease path length during a first interval, and then to increase path length during a second interval. An initial set of measurement parameters may include a first data collection rate that is applied during continuous movement of the optical probe, so as to decrease path length L. Based upon a calculated value of m, derived from I data collected during the first interval, the data collection rate may be adjusted to a second data collection rate during the second interval.

Figure 2B:
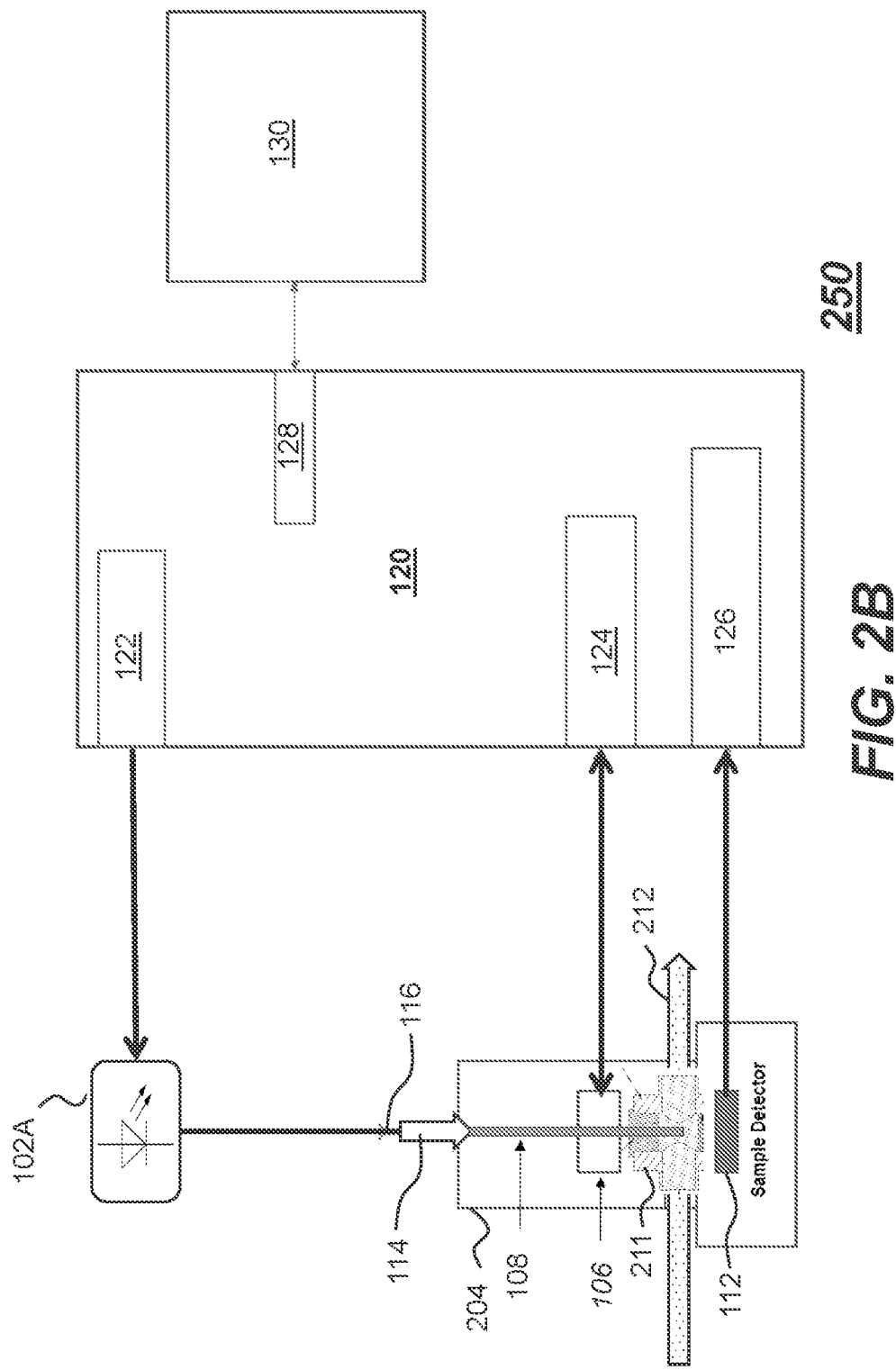
FIG. 2B shows a variant of the system of FIG. 2A.

Another advantage of the present embodiments is the ability to adjust measurement parameters to account for dynamic changes in a fluid sample being measured. FIG. 2A depicts another system, shown as system 200, according to further embodiments of the disclosure. The system 200 is arranged similarly to system 100, described previously, where like components are labeled the same, and may function similarly to one another. FIG. 2B shows a variant of the system 200, as system 250, having an LED light source 102A, where other components of the system 250 may function similarly to those of system 200, with like components labeled the same. Turning to FIG. 2A in particular, the system 200 is depicted as coupled to an external processing system, represented as processing system 210. As such, the processing system 210 may represent any suitable system generating a fluid sample to be measured, such as a chromatography system, a protein purification system, a filtration systems, or other fluid processing system, as previously noted.

In the scenario of FIG. 2A, the processing system 210 is depicted as generating a fluid sample 212 that is conducted through a fluid sample vessel 211 of measurement apparatus 204, in order to measure a concentration C of a material in the fluid sample 212. In operation, the light source 102, measurement apparatus 204, controller 120, and computer 130 may operate similarly to similar components of system 100 to measure C by determining DA/DL, as detailed above. Similarly, the system 200 may automatically adjust measurement parameters based upon determination of the slope parameter m during a measurement, as generally detailed above. The adjustment to measurement parameters may be done dynamically, such as during movement of a probe, or may be performed in an iterative manner to perform successive measurements with different measurement parameters, adapted according to account for calculated entities, such as m. In the scenario of FIG. 2A, because the fluid sample 212 is provided from an external system, and may move through the fluid sample vessel 211, changes in the value of C may be contemplated. Because changes in C will be reflected in changes in the slope parameter m, the system 200 provides a useful means to dynamically adjust measurement parameters to account for changes in slope parameter m during measurement that may be more likely in a flowing fluid sample that is provided from an external system. In particular, the system 200 may create a series of more accurate measurement intervals during a given sample measurement procedure for a fluid sample, where during a given measurement interval, the measurement parameters, such as data acquisition rate and maximum path length, are more suitably matched to the most current value of C, as determined dynamically during measurement.

FIG. 5 presents a process flow 500, according to embodiments to the disclosure. At block 502, initial absorbance measurement parameters are set in an absorbance measurement system. The absorbance measurement apparatus may be arranged to measure substance concentration in a fluid sample using the principles of slope spectroscopy, as detailed with respect to the embodiments of FIGS. 1A-2B, for example. The absorbance measurement parameters may include a motion profile for an optical probe that is used to change the transmitted intensity of radiation by moving through the fluid sample; a data collection rate for collecting transmitted intensity data; a maximum path length of radiation through the fluid sample, to name a few non-limiting examples.

At block 504, a measurement procedure is initiated in the absorbance measurement apparatus. The measurement procedure may be initiated by sending a signal, at an initial instance to a motor or other drive mechanism, in order to initiate movement of the optical probe along a probe axis through the fluid sample, when the fluid sample is contained in a measurement apparatus of the absorbance measurement system.

At block 506, during a measurement interval, referred to as a current measurement interval, probe radiation is directed through the optical probe while the probe is moved through the fluid sample. In some examples, the probe radiation may be generated intermittently, such as at given intervals, corresponding to different path lengths of the probe radiation through the fluid sample. In some examples the probe radiation may be directed during continuous movement of the optical probe.

At block 508, during the current measurement interval, the intensity ($I_1, I_2, I_3, \ldots$) of attenuated radiation, meaning the probe radiation after passing through the fluid sample, is measured at a plurality of instances, corresponding to a plurality of different path lengths ($L_1, L_2, L_3, \ldots$) of the probe radiation through the fluid sample.

At block 510, an initial slope parameter DA/DL or m, is determined based upon at least a pair of path length values and a corresponding pair of transmitted intensity values $L_1$, $I_1, L_2$, and $I_2$ from the current measurement interval.

The flow then proceeds to decision block 512 where a determination is made as to whether the measurement operation is complete. If so, the process ends. If not, the flow moves to decision block 514.

At decision block 514 a determination is made as to whether the slope parameter value m is acceptable. According to different embodiments, this determination may be made in different ways. For example, a predetermined criterion for acceptance may hinge on whether the currently calculated value of m is smaller than a threshold value, is larger than a threshold value, is within a predetermined range, and so forth. If so, flow proceeds to block 516.

At block 516, the system determines to proceed through an additional measurement interval without changing measurement parameters. The flow then proceeds to block 506.

At decision block 514 if the slope parameter value m is not acceptable, the flow proceeds to block 518. At block 518, at least one absorbance measurement parameter is adjusted, including at least one of; a maximum path length of the optical probe, a motion profile for the optical probe, and a data collection rate during motion of the optical probe. The flow then proceeds to block 506.

While the present arrangement has been disclosed with reference to certain embodiments, numerous modifications, alterations and changes to the described embodiments are possible without departing from the spirit and scope of the disclosed arrangement, as defined in the appended claims. Accordingly, it is intended that the present arrangement not be limited to the described embodiments, but that it has the full scope defined by the language of the following claims, and equivalents thereof.

The invention claimed is:

1. An absorbance measurement system, comprising:
   a light source, to generate a probe signal, comprising incident radiation;
   an optical probe, arranged to direct the incident radiation through a fluid sample;
   a motor, arranged to move the optical probe along a probe axis, to change a path length of the incident radiation through the fluid sample;
   a detector, disposed to receive the incident radiation as attenuated radiation after passing through the fluid sample; and
   a control system, arranged to:
   initiate an absorbance measurement of the fluid sample by directing movement of the optical probe along the probe axis; and
   direct the light source to emit the incident radiation; and
   wherein the light source comprises a light emitting diode (LED), configured to receive a triggering signal from the control system and to generate the incident radiation at a characteristic wavelength upon receipt of the triggering signal,
   wherein the detector is configured to detect an intensity of the attenuated radiation over a wavelength range spanning the characteristic wavelength, and over a detection interval of no more than 10 microseconds; and wherein the control system is arranged to direct the motor to move the optical probe in a pair of opposite directions along the probe axis, wherein intensity of the attenuated radiation is recorded while the motor moves the probe along a first direction of the pair of opposite directions and while the motor moves the probe along a second direction of the pair of opposite directions.

2. The absorbance measurement system of claim 1, wherein the control system is arranged to synchronize the triggering signal, for generation of the incident radiation by the LED, and a receipt of the intensity of the attenuated radiation to less than 10 microseconds.

3. The absorbance measurement system of claim 1, wherein the control system is arranged to:
receive, at a plurality of instances during a measurement interval, a set of probe position information during continuous movement of the optical probe;
determine the change in the path length, over the measurement interval, based upon the set of probe position information;
receive, at the plurality of instances, a set of intensity information for the attenuated radiation; and
automatically change the at least one measurement parameter, for a subsequent measurement interval of the absorbance measurement, based upon a value of a slope parameter m, determined from the change in the path length over the measurement interval, and a change in the intensity of the attenuated radiation over the measurement interval.

4. The absorbance measurement system of claim 3, wherein the at least one measurement parameter comprises a maximum path length of optical probe, a motion profile of the optical probe, and a data collection rate of the set of probe position information and the set of intensity information.

5. The absorbance measurement system of claim 1, wherein the control system to determine a concentration C of a material in the fluid sample, where C=m/e, wherein e is a molar absorptivity of the material.

6. A method of determining a concentration of a material in a fluid sample, comprising:
initiating a sample measurement of the fluid sample to determine the concentration, by sending a signal to move an optical probe through a sample vessel containing the fluid sample;
triggering, at a plurality of instances during a measurement interval, a light source to emit an incident radiation through the optical probe and the fluid sample, wherein a path length L of the incident radiation through the fluid sample is varied; and
receiving, at the plurality of instances during the measurement interval, a measurement of an intensity/of attenuated radiation, derived from the incident radiation after passing through the fluid sample;
wherein the light source comprises a light emitting diode (LED), configured to receive a triggering signal from the control system and to generate the incident radiation at a characteristic wavelength upon receipt of the triggering signal,
wherein the detector is configured to detect an intensity of the attenuated radiation over a wavelength range spanning the characteristic wavelength, and over a detection interval of no more than 10 microseconds; and
wherein the control system is arranged to direct the motor to move the optical probe in a pair of opposite directions along the probe axis, wherein intensity of the attenuated radiation is recorded while the motor moves the probe along a first direction of the pair of opposite directions and while the motor moves the probe along a second direction of the pair of opposite directions.

7. The method of claim 6, wherein m=DA/DL, wherein DA=log $I_1$ –log $I_2$, where $I_1$ represents the intensity I at a first instance, $I_2$ represents the intensity I and a second instance, and DL represents a change in the path length L between the first instance and the second instance.

8. The method of claim 6, further comprising:
receiving a set of probe position information corresponding to a first probe position at a first instance and a second probe position at a second instance;
determining a first path length $L_1$ of the incident radiation from the first probe position; and
determining a second path length $L_2$ of the incident radiation from the second probe position, wherein $DL=L_2-L_1$.

9. The method of claim 6, wherein the automatically adjusting comprises:
adjusting a maximum path length of the optical probe, a motion profile of the optical probe, a data collection rate of the intensity I, or combination thereof, to form a revised set of measurement parameters.

10. The method of claim 6, wherein the light source comprises a light emitting diode (LED), the method further comprising synchronizing the triggering light source and the receiving the measurement to less than 10 microseconds.

11. The method of claim 6, the sending the signal to move the optical probe comprising directing a motor to move the optical probe along a probe axis.

12. The method of claim 11, comprising signaling the motor to move the optical probe in pair of opposite directions along the probe axis, wherein the receiving the measurement of the intensity comprises:
receiving a first set of detected intensity measurements while the optical probe is moved along a first direction of the pair of opposite directions, and
receiving a second set of detected intensity measurements while the probe is moved along a second direction of the pair of opposite directions.

13. The method of claim 6, wherein the automatically adjusting comprises:
determining whether a slope parameter m is acceptable according to a predetermined criterion;
adjusting the at least one measurement parameter when m is not acceptable; and
and continuing the sample measurement for a second measurement interval using the set of measurement parameters, without adjustment, when m is acceptable.

14. A non-transitory computer-readable storage medium storing computer-readable program code executable by a processor to:
initiate a sample measurement to determine a concentration of a substance in a fluid sample, by sending a signal to move an optical probe through a sample vessel containing the fluid sample;
trigger, at a plurality of instances during a measurement interval, a light source to emit an incident radiation through the optical probe and the fluid sample, wherein a path length L of the incident radiation through the fluid sample is varied; and
receive, at the plurality of instances during the measurement interval, a measurement of an intensity/of attenuated radiation, derived from the incident radiation after passing through the fluid sample; and wherein the light source comprises a light emitting diode (LED), configured to receive a triggering signal from the control system and to generate the incident radiation at a characteristic wavelength upon receipt of the triggering signal, wherein the detector is configured to detect an intensity of the attenuated radiation over a wavelength range spanning the characteristic wavelength, and over a detection interval of no more than 10 microseconds; and wherein the control system is arranged to direct the motor to move the optical probe in a pair of opposite directions along the probe axis, wherein intensity of the attenuated radiation is recorded while the motor moves the probe along a first direction of the pair of opposite directions and while the motor moves the probe along a second direction of the pair of opposite directions.

15. The non-transitory computer-readable storage medium of claim 14, wherein $m=DA/DL$, wherein $DA=\log I_1 - \log I_2$, where $I$ represents the intensity I at a first instance, $I_2$ represents the intensity I and a second instance, and DL represents a change in the path length L between the first instance and the second instance.

16. The non-transitory computer-readable storage medium of claim 14, the computer-readable program code executable by the processor to:

receive a set of probe position information corresponding to a first probe position at a first instance and a second probe position at a second instance;

determine a first path length $L_1$ of the incident radiation from the first probe position; and determine a second path length $L_2$ of the incident radiation from the second probe position, wherein $DL=L_2-L_1$.

17. The non-transitory computer-readable storage medium of claim 14, the computer-readable program code executable by the processor to:

adjust a maximum path length of the optical probe, a motion profile of the optical probe, a data collection rate of the intensity I, or combination thereof, to form a revised set of measurement parameters.

18. The non-transitory computer-readable storage medium of claim 14, the computer-readable program code executable by the processor to:

determine whether a slope parameter m is acceptable according to a predetermined criterion;

adjust the at least one measurement parameter when m is not acceptable; and and continue the sample measurement for a second measurement interval using the set of measurement parameters, without adjustment, when m is acceptable.

* * * * *

UNITED STATES PATENT AND TRADEMARK OFFICE
CERTIFICATE OF CORRECTION

| | | |
|---|---|---|
| PATENT NO. | : 12,422,356 B2 | Page 1 of 1 |
| APPLICATION NO. | : 18/198701 | |
| DATED | : September 23, 2025 | |
| INVENTOR(S) | : Matthew Muller et al. | |

It is certified that error appears in the above-identified patent and that said Letters Patent is hereby corrected as shown below:

In the Claims

Column 10, Claim 1, Lines 59-61, replace "direct the light source to emit the incident radiation; and wherein the light source comprises a light emitting diode" with --direct the light source to emit the incident radiation; wherein the light source comprises a light emitting diode--;

Column 11, Claim 6, Lines 54, replace "surement interval, a measurement of an intensity/of" with --surement interval, a measurement of an intensity $I$ of--;

Column 12, Claim 14, Line 65, replace "surement interval, a measurement of an intensity/of" with --surement interval, a measurement of an intensity $I$ of--;

Column 12, Claim 14, Lines 66-67, replace "incident radiation after passing through the fluid sample; and wherein" with --incident radiation after passing through the fluid sample; wherein--;

Column 13, Claim 15, Line 21, replace "where/represents" with --where $I_1$--.

Signed and Sealed this
Sixteenth Day of December, 2025

John A. Squires
*Director of the United States Patent and Trademark Office*